United States Patent Office.

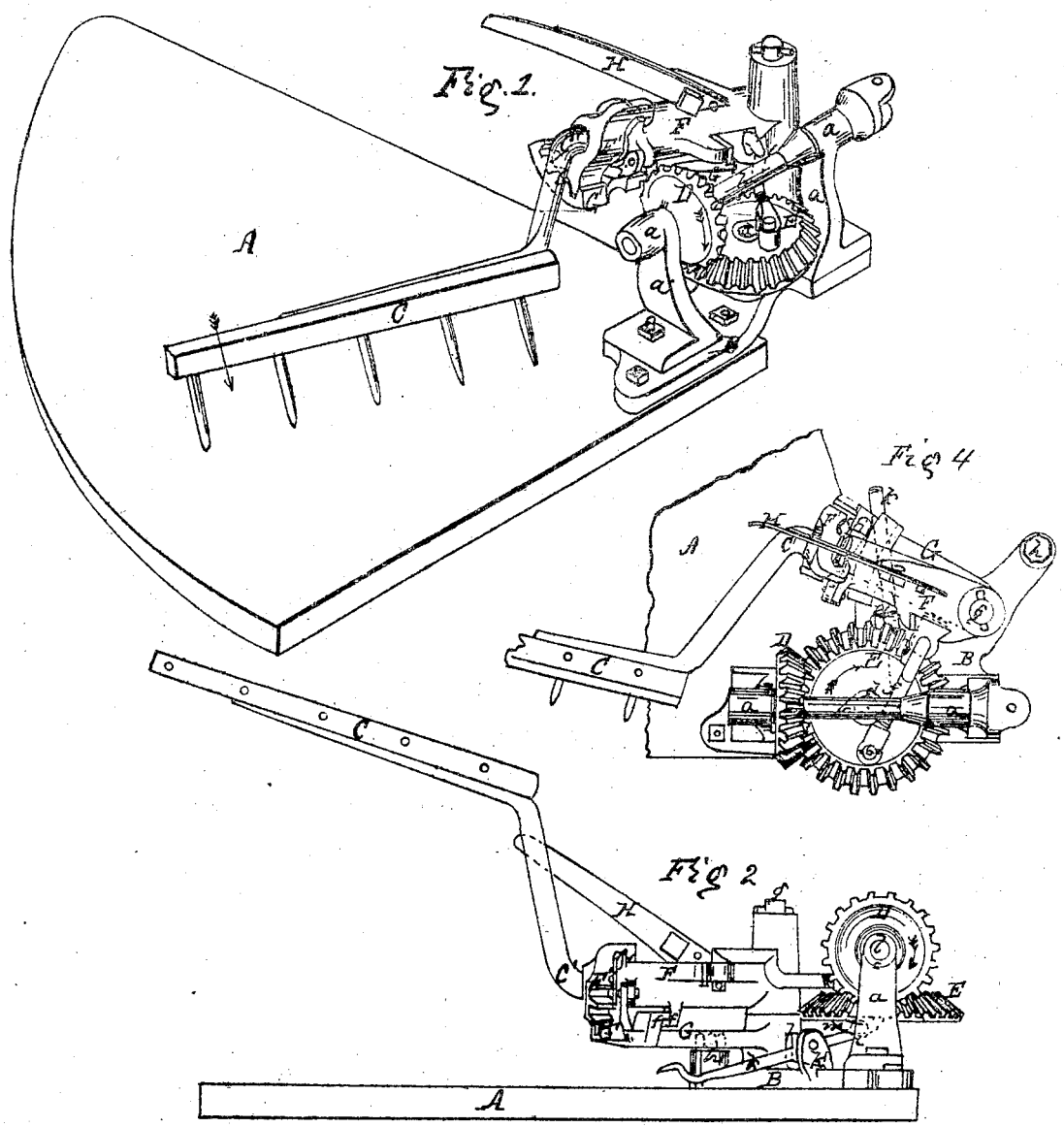

JOSEPH DICK, JR., OF CANTON, OHIO, ASSIGNOR TO HIMSELF AND EUGENE GLEN, OF ROCHESTER, NEW YORK.

Letters Patent No. 73,878, dated January 28, 1868.

IMPROVEMENT IN HARVESTER-RAKES.

The Schedule referred to in these Letters Patent and making part of the same.

TO ALL WHOM IT MAY CONCERN:

Be it known that I, JOSEPH DICK, Jr., of Canton, in the county of Stark, and State of Ohio, have invented certain new and useful Improvements in Harvester-Rakes; and I do hereby declare the following to be a full, clear, and exact description of the same, reference being had to the accompanying drawings, in which—

Figure 1 is a perspective view of a grain-platform, having my improved rake attached, taken from the outer front corner of the platform, and showing the rake descending upon said platform into position to sweep the grain therefrom.

Figure 2 is a grain-side elevation of the same, showing the rake in its elevated position after having swept the platform.

Figure 3 is an end elevation, with the rake in position represented in fig. 1.

Figure 4 is a plan or top view of the rake-gearing; and

Figure 5 represents the rake-latch, which holds the rake in its elevated position, detached.

Similar letters of reference denote corresponding parts in all the figures.

My invention consists in a novel arrangement of the rake-gearing, whereby all the movements of the rake, both reciprocating and rising and falling, are made positive and regular, whatever may be the position of the platform in conforming to the surface of the ground over which it is drawn; whereby, also, it is brought into compact shape, and mounted upon a single plate or casting attached to and removable from or with the platform or finger-bar, as hereinafter explained.

It further consists in the arrangement of the gearing relative to the shaft or support upon or about which the rake vibrates; in the arrangement of the sector-plate and segment-pinion, which control the rising and falling movements of the rake; in the construction and manner of combining the vibrating arms carrying the rake, and the devices for raising and depressing the same; in the arrangement of the latch for holding the rake in its elevated position during its forward or return movement; and in the manner of operating the lever for releasing said latch, to permit the descent of the rake upon the platform, as hereinafter explained.

In the accompanying drawings, A represents the platform of the machine, made in quadrant form, and designed to be attached to the finger-bar of a harvester, either hinged or rigid, in the usual manner. B is a gear-plate, upon which the vibrating rake C and rake-gear are mounted, made in form substantially as represented in figs. 1 and 4, adapted to receive standards $a\ a$, to support the horizontal shaft $b$, and provided with sockets or bearings, $c$, to receive the vertical crank and rake-shafts or supports hereinafter described. The standards $a$ are bolted or otherwise firmly secured to gear-plate B, and are provided at their upper ends with tubular or eye bearings, in which the shaft B is mounted. Said shaft is provided at its inner or main-frame end with a gimbal or universal joint, and is designed to be an extension of a shaft connected and driven from the main frame or axle but adapted to conform to the movement of the platform. D is a bevel driving-wheel, mounted on shaft $b$, and gearing with the bevel-crank wheel E, made as represented, and arranged horizontally underneath shaft $b$, and between standards $a\ a$, bent as shown to receive it. The bevel-wheel E is attached to the upper end of a vertical shaft, $d$, mounted in a tubular socket, $c$, in plate B, and has attached to its face an eccentric or crank-pin, $e$, from which, through pitman $f$, motion is imparted to the rake. The opposite or rear end of pitman $f$ is connected to a vibrating tubular arm, F, swinging on an upright or vertical shaft, $g$, mounted in a socket in gear-plate B, in which tubular arm or "rake-carrier" the inner end of the angular rake C′ is inserted, in such manner as to be free to turn, to accommodate the necessary rising and falling movements of the rake, retained in position therein by means of a segment lip or flange on the outer end of arm F, and an overhanging hook or lip formed upon or attached to the turning-arm C′, or to a segment-pinion, F, mounted upon and turning said rake-arm. The attachment of the pitman to the arm F is made through an adjustable lug or block of dove-tail or equivalent form, fitting in a corresponding socket in the arm, and made laterally adjustable by wedges or keys, to vary the distance of the eye from the centre or shaft, and thereby change the throw of the rake, and the pitman, instead of connecting directly with the rake-carrier, may connect with a heel or branch thereof on the frame side of rake-pivot, and the inner standard $a$ may be varied in form to accommodate the movement of the pitman in such changed relation. G is a second vibrating arm, also mounted on the vertical shaft or stud $g$, underneath the tubular arm F, and armed at its outer end with a toothed sector, G', the teeth of which engage with the teeth of segment or pinion F', and through which the rake-arm is made to rock or roll in its tubular carrier, to raise and depress the rake as required. The two vibrating arms, F G, are mounted upon and vibrate about a common centre, $g$, and may be further united at or near their swinging ends by means of matching lips or hooks $f'$, in such manner as effectually to prevent slipping of the teeth of the toothed sector and sector-pinion mounted thereon. These hooks may be dispensed with, however, if desired. On the face of arm F, arranged in about the same vertical plane therewith, is an inclined arm, H, or stop, which serves to limit the upward throw or degree of elevation of the rake. Said stop is made in the form of a flat spring-plate, and may be attached to arm F, as shown, or at any other convenient point, and in any suitable manner. $h\ h'$ are adjustable stops, secured to gear-plate B, the stop $h$ being made in this instance in the form of a bolt passing through the gear-plate, and provided with an eccentric head, so that, by the turning of the bolt, the position of the head is varied to regulate the extent of vibration of the rake in its discharge-stroke or movement, as desired. $i$ is a latch, hinged or pivoted at its upper and forward end to the tubular arm F, and provided at its opposite end with an angular or flanged hook, which engages with or drops over the rear edge of the sector-plate when the rake is raised for its return movement over the platform, and serves to prevent any relative movement of the rake and sector-arms, and to hold the rake in its elevated position. $k$ is an angular lever, pivoted in a lug or standard, $k'$, and provided at one end with a friction-roller, $l$, which is operated upon by a cam-wheel, in such manner as to vibrate the lever $k$, to release the latch $i$, and allow the rake to descend upon the front of the platform at each revolution of said crank-wheel, through which the vibratory movements of the rake are imparted, as described.

The operation of the several parts will be readily understood from the foregoing description. The rotation of the crank imparts a vibrating movement to the rake-carrier and sector-arms, which are united to a common shaft or centre, and geared by the rack and pinion, as explained, and, being supposed to be moving to the rear to discharge the grain from the platform, the vibration is continued until the sector-arm reaches the stop $h$, when its further movement being arrested before the extent of throw of the crank $e$ is reached or provided for, the tubular rake-carrier is caused to travel over the sector-plate, thereby causing the segment-pinion to traverse the rack, and to roll the rake-arm in its bearings in the carrier-arm until the rake is thrown up into position shown in fig. 2, when its further movement is arrested by the stop H, at or near the same instant that the crank reaches the extent of its throw. This change of position of the rake-carrier and sector-arms brings the latch into position to engage with the sector-arm, and thereby prevent the further relative change of said arms until the return vibration of the sector-arm is arrested by stop $h'$, at which instant the lever $k$ acts to release the latch $i$, when the continued movement of the rake-arm causes the rake to roll forward under the reel, and down upon the front of the platform, into position to repeat its effective or discharge-stroke.

It will be seen that, by this arrangement of the gears and vibrating rake-carrier, sector-arm, and pinion, all the movements of the rake are made positive, and the usual abrupt descent or fall of the rake is obviated, and the rake is made to operate equally well in any position the platform may assume in conforming to the surface of the ground.

What I claim, and desire to secure by Letters Patent, is—

1. The gear-plate or casting, made in one piece, with bearings for the crank-wheel and vibrating rake-shaft or support, and provided with standards $a$, and adjustable stops, substantially as described.

2. The arrangement of the crank-wheel which drives the rake relative to the shaft or support of the rake, substantially as described.

3. The arrangement of the crank-wheel in the described relation to the uprights or arms in which its driving-shaft is mounted, as described.

4. The horizontal shaft, through which motion is imparted to the vibrating rake and rake-gearing, mounted in uprights on the gear-plate or its equivalent, and over the crank-wheel, substantially as described.

5. The vibrating rake-carrier and sector-arms, combined and operating substantially as described.

6. The vibrating rake-arm, in combination with its tubular carrying-arm, substantially as described.

7. The vibrating sector-arm, in combination with a toothed segment or its equivalent on the rake-arm, operating substantially as described.

8. A latch connected to the vibrating rake-arm, and operating in connection with the vibrating sector-arm to hold the rake in its elevated position, substantially as described.

9. The arrangement of the lever $k$ relative to the vibrating arms, and rake-latch for releasing the same, as set forth.

10. The latch-lever, operated to release the latch by means of a cam or projection on the crank-wheel, as set forth.

11. The employment of a yielding or spring-stop for limiting the upward throw of the rake.

12. The arrangement of the spring-stop or its equivatent upon the vibrating rake-arm, substantially as described.

13. The adjustable dove-tail lug, through which the pitman is connected with the vibrating rake-carrier, substantially as described.

In testimony whereof, witness my hand, this 21st day of December, 1867.

JOSEPH DICK, Jr.

Witnesses:
H. H. SMITH,
ALEX. MAHON.